United States Patent
Duval

(10) Patent No.: US 9,283,421 B2
(45) Date of Patent: Mar. 15, 2016

(54) STATIONARY EXERCISE EQUIPMENT POWER GENERATOR

(71) Applicant: E Gen, LLC, San Clemente, CA (US)

(72) Inventor: Landon Duval, San Clemente, CA (US)

(73) Assignee: E. GEN LLC, Mission Viejo, CA (US)

( * ) Notice: Subject to any disclaimer, the term of this patent is extended or adjusted under 35 U.S.C. 154(b) by 192 days.

(21) Appl. No.: 13/848,495

(22) Filed: Mar. 21, 2013

(65) Prior Publication Data
US 2014/0287875 A1   Sep. 25, 2014

(51) Int. Cl.
| | | |
|---|---|---|
| *A63B 24/00* | (2006.01) | |
| *A63B 21/005* | (2006.01) | |
| *A63B 22/06* | (2006.01) | |
| *A63B 21/00* | (2006.01) | |
| *A63B 21/22* | (2006.01) | |
| *A63B 22/02* | (2006.01) | |
| *H02J 3/38* | (2006.01) | |
| *H02J 7/14* | (2006.01) | |

(52) U.S. Cl.
CPC ......... *A63B 21/0053* (2013.01); *A63B 21/0054* (2015.10); *A63B 21/0055* (2015.10); *A63B 21/0058* (2013.01); *A63B 21/00181* (2013.01); *A63B 22/0605* (2013.01); *A63B 21/225* (2013.01); *A63B 22/02* (2013.01); *A63B 22/0664* (2013.01); *H02J 3/382* (2013.01); *H02J 7/1407* (2013.01); *H02J 7/1415* (2013.01)

(58) Field of Classification Search
CPC ........... A63B 21/0053; A63B 21/0058; A63B 21/225; A63B 21/00181; A63B 21/0054; A63B 21/0055; A63B 22/02; A63B 22/0605; A63B 22/0664; A63B 24/00
See application file for complete search history.

(56) References Cited

U.S. PATENT DOCUMENTS

| | | | |
|---|---|---|---|
| 6,229,224 B1 | 5/2001 | Gagne | |
| 6,717,280 B1 | 4/2004 | Bienville | |
| 7,090,620 B1 | 8/2006 | Barlow | |
| 7,504,737 B2 | 3/2009 | Vasilovich et al. | |
| 2002/0147079 A1 | 10/2002 | Kalnbach | |
| 2005/0023917 A1* | 2/2005 | Kesting et al. | 310/156.43 |
| 2009/0054207 A1 | 2/2009 | Lin et al. | |
| 2010/0090475 A1 | 4/2010 | Tsai et al. | |
| 2011/0272944 A1* | 11/2011 | Peng | 290/50 |
| 2012/0010048 A1 | 1/2012 | Bayerlein et al. | |
| 2012/0184408 A1 | 7/2012 | Cheng | |

FOREIGN PATENT DOCUMENTS

| | | | |
|---|---|---|---|
| AU | 2011100757 A4 | 6/2011 | |
| CN | 201272473 Y | 7/2009 | |
| CN | 201840829 U | 5/2011 | |
| GB | 2069768 | * | 8/1981 |

* cited by examiner

*Primary Examiner* — Glenn Richman
(74) *Attorney, Agent, or Firm* — Patent Law & Venture Group; Gene Scott

(57) ABSTRACT

An exercise apparatus is mechanically engaged with an electrical current producer so that exercise by a person using the apparatus produces output power which is used at the time of exercising or saved for later use. A motor provides additional drive force by rotating a rotor engaged with the apparatus, the rotor operating by magnetic attraction and repulsion depending on relative positions of permanent magnets on the rotor and electromagnets on a stator. The apparatus is light in weight, low cost to produce and highly durable.

18 Claims, 2 Drawing Sheets

STATIONARY EXERCISE EQUIPMENT POWER GENERATOR

BACKGROUND

This disclosure relates to the field of exercise equipment and more particularly to an exercise equipment enabled for generating electrical energy and for using and storing said energy. Exercise equipment is well known in the field of this disclosure. However, it is not known to use an exercise equipment in conjunction with a magnetic motor to improve the output of the apparatus. The following disclosure defines an apparatus which is able to produce a significant output current using such an integrated motor.

BRIEF SUMMARY AND ADVANTAGES

The present disclosure describes an exercise apparatus or system, and method for generating and storing electrical energy. The apparatus in one embodiment is a stationary bicycle with a means for turning an electrical generator by pedaling. The generator provides resistance against which the bicycle rider peddles. In alternate embodiments the apparatus may be configured as a treadmill, an elliptical exerciser or any other personal exercise machine. An electromagnet motor is coupled to the bicycle in a manner such that it is actuated by electromagnetic switching during peddle rotation and delivers rotational energy to the generator complimenting the energy provided by the peddles and relieving the amount of force required to drive the generator. The electrical energy generated by the apparatus may be stored in batteries, used locally at the time of production, delivered to the utility grid, or used in other ways. Those of skill in the art will know how to rectify, transform, frequency convert, and invert the output of the apparatus directly, or from storage batteries, for its intended uses.

The daily output of the apparatus may be 1-3 kilowatts during one hour of cycling, that is the apparatus may drive four 500 watt alternators. If this is repeated each day according to one exercise program, a total of 62 kilowatt hours may be produced (stored and/or used) per month. In the United States, retail electricity costs between eight and seventeen cents per kilowatt hour according to the International Energy Agency (IEA). Assuming a residential cost per kilowatt hour is 12 cents, then for a residence paying $50 per month for electric service, a total of 417 kilowatt hours of electricity is consumed. In this example we see that about 15% of the residential cost of electricity is saved. In locations such as Hawaii where electricity may cost a multiple of that in the continental Unites States, the apparatus may provide as much as a 50% reduction in domestic costs for residential electricity.

The system is intended to be used in a residential or commercial environment. When used with multiple units operating simultaneously, as for example within a public or commercial exercise facility, it is conceivable that the electrical output of many units of the system might fully pay for electric service to the facility and also enable placing power onto the public utility grid.

The primary advantage of the presently disclosed apparatus is the two-fold benefit of using exercise energy for health and simultaneously for reducing the cost of electrical power drawn from the electric utility grid. Other advantages include light weight, small size, relatively low cost, production of no greenhouse gases or other environment degrading products, use of output at the time of production or storage for later use, and operation in conjunction with solar and wind power generators.

The details of one or more embodiments of these concepts are set forth in the accompanying drawings and the description below. Other features, objects, and advantages of these concepts will be apparent from the description and drawings, and from the claims.

BRIEF DESCRIPTION OF THE SEVERAL VIEWS OF THE DRAWING

Like reference symbols in the various drawings indicate like elements.

DETAILED DESCRIPTION

Figure 1:
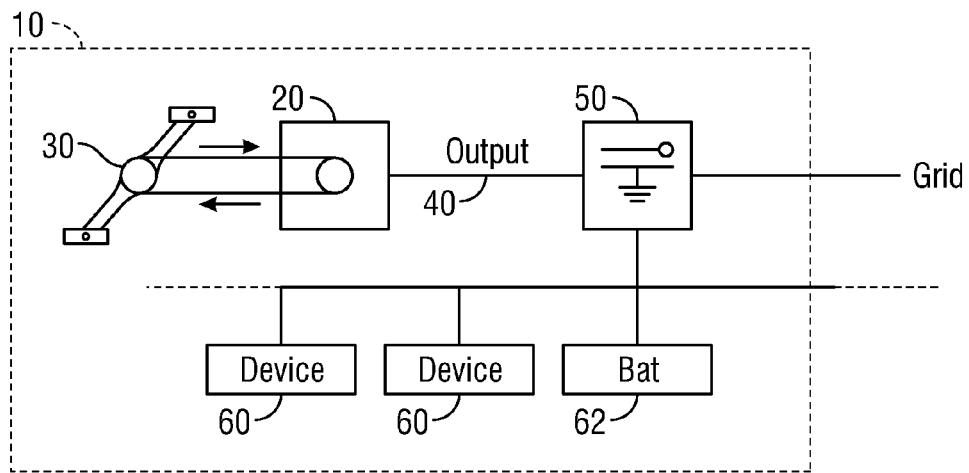
FIG. 1 is an example schematic diagram of the presently described apparatus.

As described in the above summary, system 10 provides resistance training to a user, where the resistance is created by one or more electricity producers 20 such as generators and alternators, but not limited thereto. In the schematic diagram of FIG. 1 details of system 10 are shown including: a human exercise device 30 which provides pedals or other human drive interface. Device 30 may be a stationary exercise bicycle for instance in one embodiment. The device 30 may be mechanically connected to one or more of the electricity producers 20. If alternating current (AC) is produced it may be single phase, 60 hertz, at 115 volts, or 50 hertz, at 230 volts, and therefore may be applied directly within a residence for instance for operating lights, toasters, mixers, drills, and other small or large appliances. If direct current (DC) is produced, it may be used directly for operating computers, television sets, amplifiers, recorders, and other DC devices. Of course, in each case, a system output current 40 must be adapted by an interface circuit 50 to the voltage level, frequency, harmonic balance, intermittence and other requirements of the devices 60 being powered. The produced energy may also be directed to and stored for later use in one or more batteries 62 whose size and type will be known by those of skill in the art. Those of skill in the electrical arts will be able to enable such interfaces using rectification circuits, phase shifting circuits, frequency control and stabilizing circuits, inverter circuits, transformer circuits, and by other means within the electrical circuit engineering and electrical power engineering fields. Such circuits are able, as is well known, for converting between AC and DC current as well. Output power may also be provided to the electrical utility grid which considerations and means are also very well known. Output power may also be provided to on-board utilities such as controls and displays of the exercise device 30 and such facilities may be any of the known appliances in the exercise fields and any that may be introduced to this field in the future.

Figure 2:
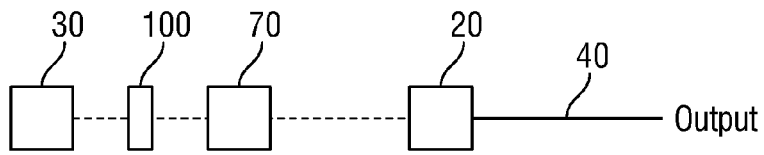
FIG. 2 is an example block diagram of a concept of the operation of en embodiment of the apparatus.
Figure 3:
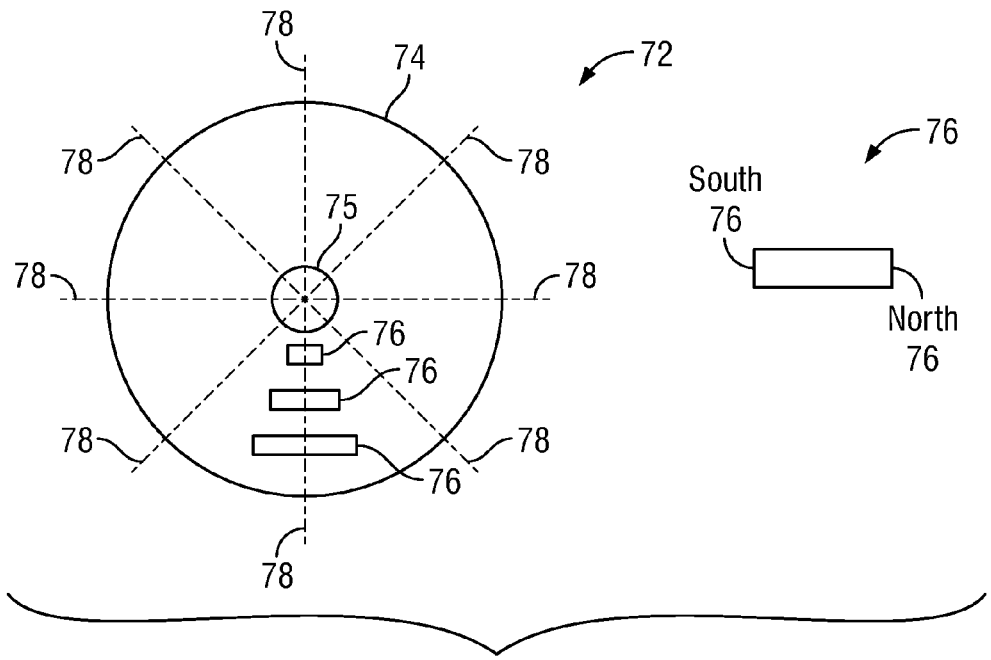
FIG. 3 is an example concept elevational view of a rotor of the apparatus.
Figure 4:
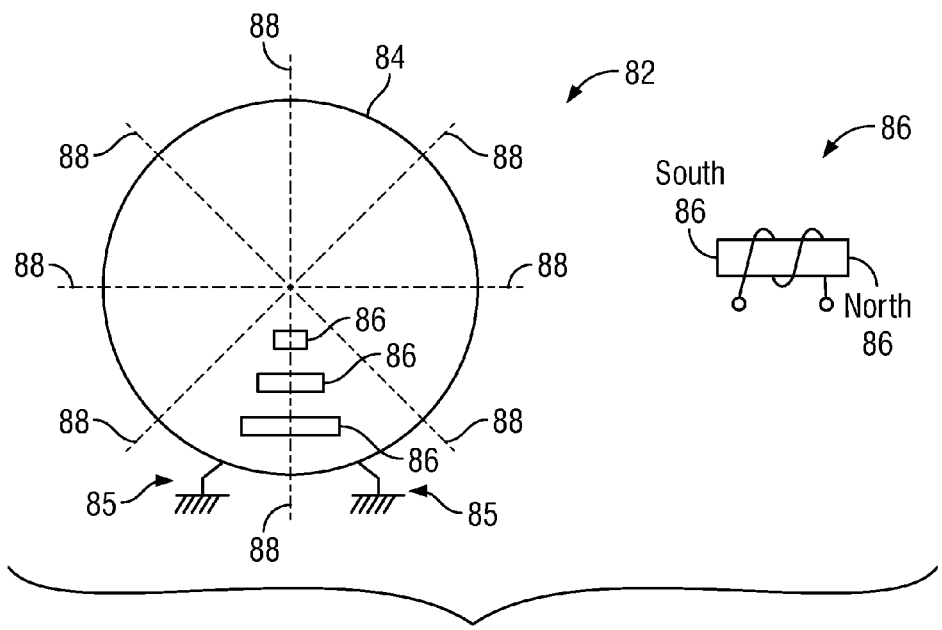
FIG. 4 is an example concept elevational view of a stator of the apparatus.

An electric motor 70 may be integrated within system 10 as shown conceptually in FIG. 2 and may also include a flywheel 100 to maintain constant speed of rotation of the motor 70 and therefore constant power output from producers 20. Motor 70 has a rotor 72 (FIG. 3) and a stator 82 (FIG. 4). Rotor 72 may function also as the flywheel 100 or one or more flywheels 100 may be inserted in the mechanical drive transmission line, which is shown in FIG. 2 by dashed lines as is typical in diagrams of this sort. The rotor 72 is mounted for rotation on axle 75 and may be driven mechanically by device 30 through a chain drive, a shaft drive, a direct drive, or any other mechanical energy transfer device, to deliver rotational motion to the rotor 72 as well as electricity producers 20 through any gear or sprocket arrangement which will be known by those of skill in the art of mechanical transmissions. The rotor 72 may be constructed as a disc-shaped wheel 74, for instance: a sprocket, gear, disk, or similar alternative, and may be made of a non-ferrous metal such as an aluminum alloy. Rotor 72 may have a plurality of high-energy permanent magnets 76 fixedly mounted thereon or therein in selected positions, as shown, by example, in FIG. 3. Magnets 76 may be linear in shape with a north magnetic pole (north 76) at one end of each, and a south magnetic pole (south 76) at the opposing end of each magnet 76. The north 76 poles may be positioned for leading the south 76 poles in the direction of rotation of rotor 72 as is shown, however the reverse may be used equally as well. Magnets 76 may be arranged, as shown, in angularly separated radial rows 78 shown by center lines in a spoke-like arrangement around rotor 72 and with magnetic poles of magnets 76 radially aligned as shown in FIG. 3. Magnets 76 may be linear in shape, as shown, or may be circumferentially curved magnet segments. Magnets 76 are illustrated in one radial row in FIG. 3, but it should be realized that similar sets of magnets 76 would be positioned on all of the rows 78, and more or less of the magnets per row and the number of radial rows may be adjusted.

Stator 82, shown in FIG. 4, may have a disc-shaped rigid support structure 84 fixedly secured at points 85 or otherwise, so that it cannot move, and may be made of a non-ferrous metal such as an aluminum alloy. Structure 84 may have mounted thereon or therein a plurality of electromagnets 86. Magnets 86 may be linear in shape with a nominal north magnetic pole north 86 at one end of each, and a south magnetic pole south 86 at the opposing end of each electromagnet 86. Magnetic poles: north 86 and south 86 are able to reverse instantaneously by reversing the direction of electrical current flowing in them. The physical positions of electromagnets 86 on structure 84 may be identical to the permanent magnet arrangement on rotor 72 so that with structure 84 placed in a mutually concentric, parallel, and in close adjacency to rotor 72 magnetic fields of the poles of rotor 72 and stator 82 magnets produce attraction and repulsion forces. Stator 82 may comprise only one or a pair of the above described structures 84 with electromagnets 86 mounted fixedly on them in the identical described manner. When structures 84 are positioned on both sides of rotor 70, magnets 76 may be mounted within apertures on wheel 74 so that their magnetic fields engage the fields of electromagnets 86 on structures 84 on both sides. As rotor 72 rotates, it is clear that the magnetic fields of magnets 76 and 86 interact with each other to produce rotational driving forces on rotor 72.

Magnets 76 and 86 may be circumferentially curved segments so that magnetic interaction therebetween is both more intimate and has a more effective duration. It should be clear from standard motor operation that by timing current direction changes in electromagnets 86, attractive and repulsive magnetic forces may be derived to provide rotational impulses to rotor 72. Relatively little, but not negligible, electrical current is expended in establishing and changing the polarity of the poles of electromagnets 86 so relatively little energy is used in this process. The momentum added to rotor 72 is generated by the attractive and repulsive magnetic forces experienced by magnets 76 as they pass magnets 86. Those of skill in motor engineering, especially with magnet motors, will be able to determine the best proximity of the magnets in the present apparatus as well as when to reverse the current in electromagnets 86 with respect to the relative positions of magnets 76 and 86 as rotor 72 completes each rotation. Alternate means of various kinds for providing magnetic forces to the rotor 72 by electromagnets 86 may be applied to the present apparatus including a swing-arm or arms that mechanically move the respective magnets into and out of mutual proximity during rotation of rotor 72. The objective is to apply as many high energy permanent magnets and corresponding high current electromagnet in the closest possible proximity to achieve the strongest magnetic attractions and repulsions possible.

Figure 5:
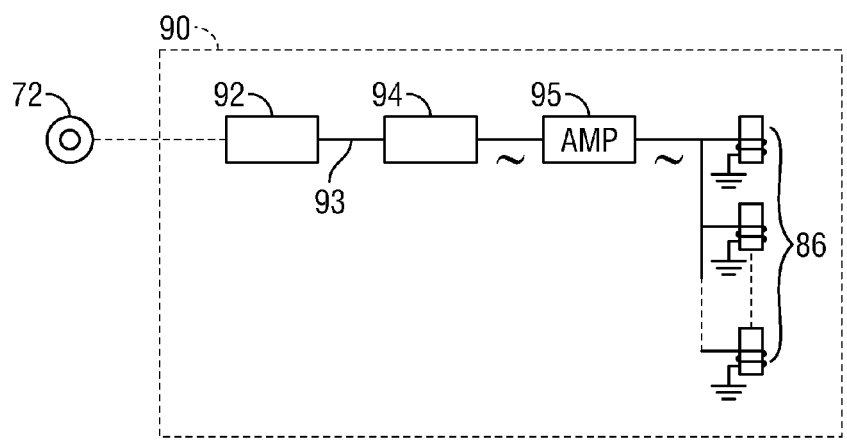
FIG. 5 is an example electrical schematic diagram of a signal flow of the apparatus.

A switching circuit 90 as shown in FIG. 5 uses a tachometer, digital rotating sensor, pulse motor, or similar instrument 92 engaged with rotor 72 to produce an electrical output signal 93 related to the instantaneous position of rotor 72. This position signal 93 is conducted to signal generator 94 and amplifier 95 whose output, a sinusoidal current with frequency related to rotor 72 rotational speed and position, drives electromagnets 86 on stator(s) in synchrony with the relative positions of the magnets 76, 86. The construction of circuit 90, i.e., reduction to practice, is within the ability of one of skill in the art, but the concept of this circuit is not. Circuit 90 enables operation and generation of electrical power at any and all speeds of rotor 72 rotation. This circuit is considered to be novel and non-obvious in light of its operation with the presently described apparatus and method of operation.

Embodiments of the subject apparatus and method have been described herein. Nevertheless, it will be understood that various modifications may be made without departing from the spirit and understanding of this disclosure. Accordingly, other embodiments and approaches are within the scope of the following claims.

What is claimed is:

1. An exercise system for generating electrical energy, the system comprising:
   a human exercise apparatus having a mechanical drive engaged directly with a motor mechanically engaged with electricity producers for generating electricity when the exercise apparatus is operated;
   the motor has a pair of stators and a rotor, the rotor positioned between the pair of stators, the rotor having permanent magnets arranged in a pattern within apertures on the rotor, the stators each having electromagnets thereon, the electromagnets arranged in the same pattern as the permanent magnets and are positioned so that magnetic fields of the permanent magnets and the electromagnets interact; and
   a switching circuit engaged with the rotor, the circuit providing a sinusoidal output electrical current conducted to the electromagnets, the current switching polarity of the electromagnets corresponding with rotational motion of the rotor and relative positions of the permanent magnets and electromagnets to produce attraction and repulsion forces between the magnets, said forces tending to drive the rotor in a selected direction.

2. The system of claim 1 wherein the exercise apparatus is a stationary bicycle.

3. The system of claim 1 wherein the producers are electrical generators or alternators.

4. The system of claim 1 wherein the drive uses a chain interconnecting a human driven device, a motor, a flywheel and the producers.

5. The system of claim 4 wherein the human driven device is a pedal driven sprocket.

6. The system of claim 4 wherein the motor has a rotor with permanent magnets thereon or therein and a stator with electromagnets thereon or therein.

7. The system of claim 6 wherein the permanent magnets and the electromagnets are arranged in a common pattern.

8. The system of claim 7 wherein the permanent magnets and the electromagnets are in close proximity.

9. The system of claim 4 wherein the flywheel is a part of a rotor of the motor.

10. The system of claim 6 wherein the permanent magnets are hi-energy magnets.

11. The system of claim 1 wherein the permanent magnets are arranged in groups in radial array, the groups separated angularly.

12. The system of claim 1 wherein the electomagnets are arranged in groups in radial array, the groups separated angularly corresponding to the permanent magnets.

13. The system of claim 1 wherein the switching circuit uses one of a tachometer, a digital rotating sensor, and a pulse motor to signal a relative position of the rotor to a signal generator.

14. The system of claim 1 wherein the switching circuit uses one of a tachometer, a digital rotating sensor, and a pulse motor to signal a rotational speed of the rotor.

15. The system of claim 1 wherein the switching circuit uses one an amplifier to produce an output current delivered to the electromagnets.

16. The system of claim 15 wherein the output current is sinusoidal for switching polarity of the electromagnets.

17. The system of claim 16 wherein the polarity of the electromagnets determines attraction or repulsion between the permanent magnets and the electromagnets.

18. The system of claim 17 wherein both the attraction and the repulsion drive the rotor in a common rotational sense.

* * * * *